Feb. 21, 1961  V. C. DUTTON  2,972,491
HYDRAULIC QUICK DISCONNECT
Filed Aug. 3, 1956  2 Sheets-Sheet 1

INVENTOR.
Victor C. Dutton
BY
Harold J. Donnes
ATTORNEY

Feb. 21, 1961 V. C. DUTTON 2,972,491
HYDRAULIC QUICK DISCONNECT
Filed Aug. 3, 1956 2 Sheets-Sheet 2

INVENTOR.
Victor C. Dutton
BY Harold J. Downes
ATTORNEY

United States Patent Office 2,972,491
Patented Feb. 21, 1961

2,972,491

HYDRAULIC QUICK DISCONNECT

Victor C. Dutton, Los Angeles, Calif., assignor to The Gabriel Company, Cleveland, Ohio, a corporation of Ohio Filed Aug. 3, 1956, Ser. No. 601,949

3 Claims. (Cl. 284—19)

This invention relates to conduits for carrying high pressure hydraulic fluids and particularly to a coupling or disconnect adapted for easy and safe operation.

The principal problems encountered in the design of hydraulic disconnects arise from the environment in which the disconnect is to be used. Typically, in modern machinery and especially in aircraft, a disconnect must be designed to withstand very high hydraulic pressure, must function safely and efficiently in a variety of temperatures and ambient conditions and must occupy a minimum of space. The use of high hydraulic pressures means that there is imposed upon a disconnect a substantial longitudinal force due to the internal pressure in the fluid lines which the disconnect connects. This force must be transmitted successfully from one element of the disconnect to the other when the two members are engaged. However, since the disconnect must be capable of quick connection and disconnection the load bearing members which carry this longitudinal force must be of simple design so that they may be quickly engaged and disengaged.

This invention contemplates a quick disconnect for extremely high hydraulic pressures which is capable of withstanding the very substantial longitudinal forces present in a disconnect used under high hydraulic pressures and which can be safely connected and disconnected with a minimum loss of fluid from the lines. This disconnect is usable in connection not only with hydraulic fluids but in connection with hazardous fluids of all kinds.

It is therefore an object of this invention to provide an improved coupling.

It is another object of this invention to provide a coupling in which the coupled members need not be rotated for coupling and uncoupling.

It is another object of this invention to provide a coupling which is capable of withstanding substantial longitudinal forces due to high fluid pressure within the lines being coupled.

It is another object of this invention to provide a disconnect coupling in which the principal longitudinal forces are borne by inter-related members which must be rotated with respect to each other to connect and disconnect them but which members are secured against rotation by a third locking member.

Figure 1:
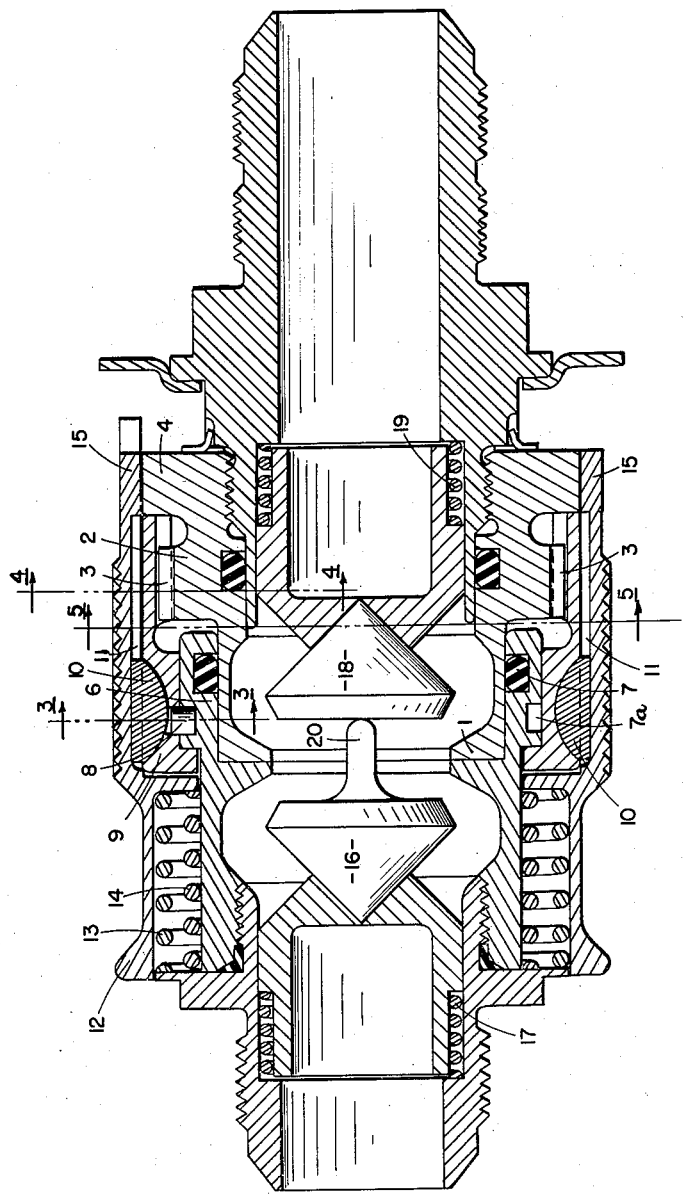
Figure 3:
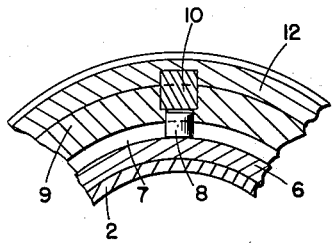
Figure 2:
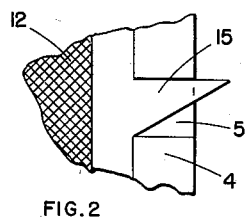
Figure 5:
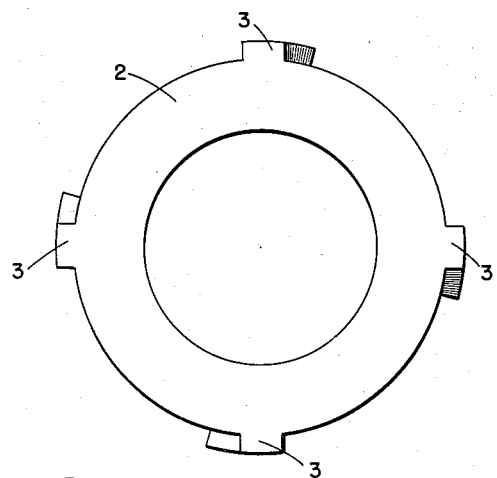
Figure 6:
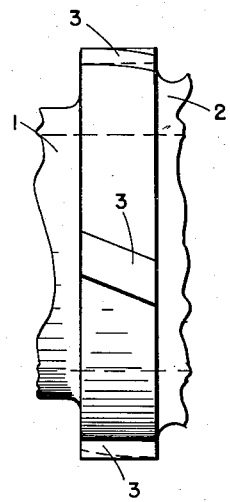
Figure 4:
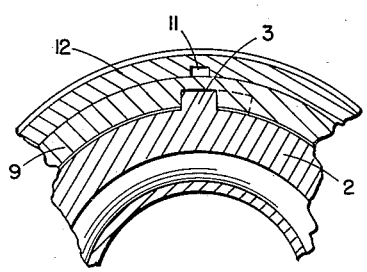

Other objects of invention will become apparent from the following description taken in connection with the accompanying drawings, in which Fig. 1 is a sectional view of the invention,
Fig. 2 is a partial top plan view of the invention,
Fig. 3 is a sectional view taken at 3—3 in Fig. 1,
Fig. 4 is a sectional view taken at 4—4 in Fig. 1,
Fig. 5 is a sectional view taken at 5—5 in Fig. 1, and
Fig. 6 is an elevational view of the male portion of the invention.

Referring now to the drawings there is shown a male coupling member 1 having an integral raised ring 2 about its periphery a predetermined distance back from the end of the member. Diagonal teeth 3 are integral with ring 2 and may be provided in various numbers about the periphery of ring 2.

Farther aft from the nose portion of male coupling member 1 is a second, larger diameter integral ring 4 which has a number of longitudinal slots 5 cut in its periphery as shown in Fig. 2. Engaging the male coupling member is female coupling member 6 which is sealed to male member 1 by O ring seal 7 carried in the inside surface of female member 6. Cut in the outside surface of female member 6 is a peripheral groove 7a into which is fitted a pin 8 which in turn is screwed into or otherwise attached to collar 9, which thus may rotate with respect to the female coupling member but may not translate with respect thereto. Collar member 9 is machined on its forward inside surface with grooves which correspond to teeth 3 in the outside of ring 2 on male member 1. Thus collar 9 is free to rotate with respect to female member 6 and in so rotating may be caused to engage with teeth 3 on the outside of the male member 1.

Key 10 attached to collar 9 engages slot 11 cut in the inside surface of outer collar 12 which fits over both female member 6 and collar 9. Since key 10 is not free to rotate with respect to collar 9, as is shown in Fig. 3, it is clear that outer collar 12 may be translated longitudinally with respect to collar 9 but may not be rotated with respect thereto.

It will be observed from Fig. 1 that collar 12 is held in place by the action of compression springs 13 and 14 which bear against the after portion of female member 6 and tend to cause collar 12 to move to the right in Fig. 1. More than one key 10 may be provided as shown in Fig. 1, so that collar 12 is secured against rotational movement with respect to collar 9.

At the very end of outer collar 12, that is, to the right in Fig. 1, a triangular protrusion 15 is provided of a base width approximately equal to the width of grooves 5 in ring 4 attached to male member 1 of the coupling. Thus as shown in Figs. 1 and 2, when the coupling is completely engaged and locked, protrusion 15 engages groove 5 and prevents rotational movement of collar 12 and likewise of collar 9. More than one, and preferably at least two, such protrusions may be provided about the periphery of the coupling and for each protrusion at least one groove 5 must be provided.

Within female coupling member 6 is provided self closing poppet 16 slideable within the coupling member and urged to a closed position by compression spring 17. Within male member 1 is provided self closing poppet 18 slideable within the coupling member and urged to a closed position by compression spring 19. Protrusion 20 on self closing poppet 16 forces both poppets to the open position when the coupling is engaged as is shown in Fig. 1. Figs. 5 and 6 show in detail the arrangement of the splined teeth upon ring 2 of male member 1 and show that the teeth are cut diagonally or helically to engage collar 9.

In operation, to disengage the coupling from the position shown in Fig. 1, wherein it will be observed that the poppets are open and fluid is free to flow through the coupling from one conduit joined thereby to the other, it is necessary only to draw outer collar 12 to the left of Fig. 1 by sliding it over key members 10 until the tip of triangular protrusion 15 reaches the left end of groove 5 in ring 4. This withdrawal is accomplished against the force of compression springs 13 and 14 so that while the coupling is engaged there is no danger of the same becoming accidentally disengaged.

After collar 12 has been thus withdrawn to the left, it may be rotated, but since collar 12 is secured by key 10 to collar 9, collar 9 is also rotated, pin 8 following peripheral groove 7a in female member 6. This rotation causes the ultimate disengagement of collar 9 from teeth 3 in ring 2 of male member 1. It will be noted from Fig. 1 that collar 12 is entirely withdrawn out of locking engagement between protrusion 15 and groove 5 before the coupling proper begins to become disengaged. This means that fluid continues to flow through the coupling until actual rotational motion of the collar is undertaken. Furthermore the width of ring 2 is chosen to be approximately equal to the travel required to open and close the poppet valves so that the rotary motion is entirely responsible for the opening and closing of the poppet valves. Thus, accidental longitudinal motion of the collar does not cause actuation of the poppet valves. In addition, the distance provided between O-ring 7 and the very end of male member 1 is substantially equal to the motion required to open and close the poppet valves so that until the poppet valves are entirely closed, the two coupling members remain sealed together.

In this arrangement of quick disconnect coupling it will be noted that the substantial longitudinal force resulting from the internal hydraulic pressure within the coupling is taken out by the sturdy splined tooth and groove arrangement existing between collar 9 and ring 2 of male member 1. It will be further noted that no rotation of either the female or male portion of the coupling occurs during the coupling and uncoupling operations.

Although the invention has been described and illustrated in detail the same is to be understood to be by way of illustration and example only, the spirit and scope of the invention being limited only by the terms of the appended claims.

I claim:

1. A coupling comprising a pair of cooperating members movable longitudinally apart and together with respect to each other, each of said members having a flow passage extending longitudinally therethrough, said members having helical means fixed longitudinally with respect thereto defining a plurality of circumferentially spaced elements and element receiving grooves interengageable to effect relative longitudinal movement of said members in response to relative rotational movement thereof, a sleeve mounted in surrounding relation to one of said members for relatively longitudinal movement with respect thereto, means positively preventing relative rotational movement between said sleeve and the helical means of said one member, spring means resiliently biasing said one member into a limiting position within said sleeve and permitting relative longitudinal yielding movement of said one member with its helical means away from said limiting position in a direction toward the other of said members, opposed interengageable surface means on the exterior of said sleeve and exterior of said other member for effecting a relative longitudinal movement between said one member and said sleeve in a direction against the action of said spring means in response to and during the relative movement of said members together from a first position of movement to a second position and for permitting a rapid relative longitudinal movement between said one member and said sleeve in the oposite direction under the action of said spring means in response to the relative movement of said members together beyond said second position of movement, said opposed surface means including opposed generally longitudinally facing surface means for effecting the relative movement of said sleeve and said one member against the action of said spring means during said movement of said members from said first position to said second position and opposed generally transversely facing surface means engageable after the relative movement of said sleeve and said one member under the action of said spring means for preventing relative rotation between said sleeve and said one member, annular sealing means on said members for providing a fluid-tight communication between the passages of said members during the relative movement of said members together when said members have reached a predetermined relative position and for maintaining such fluid-tight communication when said members are together beyond said predetermined position, valve means in at least one of said flow passages spring biased into a position to close the associated passage, and means for moving said valve means into an open position during the relative movement of said members together when said members have reached a position intermediate said first and second positions and beyond said predetermined position and for maintaining said valve means in an open position when said members are together beyond said intermediate position, said helical means and said opposed longitudinally facing surface means being so related to the force of said spring means as to prevent the self maintenance of said members in a position between said intermediate position and said second position.

2. A coupling comprising a first member having a flow passage extending longitudinally therethrough, said first member including an inner annular portion having a cylindrical exterior surface, an intermediate annular portion extending outwardly of said inner portion and having a plurality of circumferentially spaced helical teeth formed on the outer periphery thereof, and an outer annular portion extending outwardly of said intermediate portion and having a plurality of circumferentially spaced longitudinally extending slots formed in the outer periphery thereof, a second member having a flow passage terminating in a cylindrical opening in the inner end of said second member of a size to receive the inner portion of said first member, an inner sleeve having an outer portion surrounding the inner end of said second member and an inner portion extending longitudinally beyond the inner end of said second member, means acting between said second member and said inner sleeve for permitting relative rotary movement between said second member and said inner sleeve and preventing relative longitudinal movement therebetween, the outer portion of said inner sleeve having an interior periphery provided with a plurality of circumferentially spaced helical grooves for receiving the helical teeth of said first member intermediate portion, an outer sleeve mounted in surrounding relation to said second member and said inner sleeve, means acting between said inner and outer sleeves for permitting longitudinal movement therebetween and preventing relative rotary movement therebetween, means for preventing longitudinal movement of said outer sleeve beyond a limiting position with respect to said inner sleeve in a direction beyond the inner portion of the latter, spring means within said outer sleeve acting between said inner sleeve and said outer sleeve resiliently urging the latter into said limiting position, said outer sleeve having a plurality of circumferentially spaced lugs extending longitudinally from the inner end thereof and beyond the inner portion of said inner sleeve when said outer sleeve is disposed in said limiting position, said first member outer portion including longitudinally inwardly facing surfaces between said slots for engaging the oppositely facing extremities of said lugs, the extremities of said lugs being longitudinally and rotationally positioned with respect to said helical grooves to engage said first member outer portion surfaces in response to a movement of said teeth within said helical grooves into a first position and to remain in engagement with said first member third portion surfaces in response to a subsequent movement of said teeth within said helical grooves from said first position to a second position whereby during the latter movement a relative longitudinal movement between said outer sleeve and said second member in a direction against the action of said spring means will take place, said lugs being of a size and positioned to engage within said first member outer portion slots in response to a subsequent movement of said teeth within said helical grooves beyond said second position by a rapid longitudinal movement of said outer sleeve under the action of said spring means, annular sealing means in said second member opening for engaging the cylindrical surface of said first member inner portion to thereby provide a fluid-tight communication between the passages of said members during the relative movement of said members together when said members have reached a predetermined relative position and for maintaining such fluid-tight communication when said members are together beyond said predetermined position, a valve seat in said first member passage adjacent the inner end thereof facing in a direction away from such inner end, valve means disposed in said first member passage and spring urged into a closed position in engagement with said valve seat, and means carried by said second member for moving said valve means into an open position during the movement of said teeth within said helical grooves when said teeth have reached a position within said grooves intermediate said first and second positions and beyond said predetermined position and for maintaining this valve means in an open position when said teeth are within said grooves beyond said intermediate position, the engagement of said teeth within said grooves and the engagement of said lugs with said first member outer portion surfaces being so related to the force of said spring means as to prevent the self maintenance of said teeth within said grooves in a position between said intermediate position and said second position.

3. A coupling comprising a first member having a flow passage extending longitudinally therethrough, said first member including an inner annular portion having a cylindrical exterior surface, an intermediate annular portion extending outwardly of said inner portion and having a plurality of circumferentially spaced helical teeth formed on the outer periphery thereof, and an outer annular portion extending outwardly of said intermediate portion and having a plurality of circumferentially spaced longitudinally extending slots formed in the outer periphery thereof, a second member having a flow passage terminating in a cylindrical opening in the inner end of said second member of a size to receive the inner portion of said first member, an inner sleeve having an outer portion surrounding the inner end of said second member and an inner portion extending longitudinally beyond the inner end of said second member, said second member having an annular groove formed in the outer periphery thereof, a pin carried by said inner sleeve engaging with said annular groove for permitting relative rotary movement between said second member and said inner sleeve and preventing relative longitudinal movement therebetween, the outer portion of said sleeve having an interior periphery provided with a plurality of circumferentially spaced helical grooves for receiving the helical teeth of said first member intermediate portion, an outer sleeve mounted in surrounding relation to said second member and said inner sleeve, said outer sleeve having a longitudinal groove formed in the inner periphery thereof, a key carried by said inner sleeve engaging with said longitudinal groove for permitting longitudinal movement therebetween and preventing relative rotary movement therebetween, means for preventing longitudinal movement of said outer sleeve beyond a limiting position with respect to said inner sleeve in a direction beyond the inner portion of the latter, spring means within said outer sleeve acting between said inner sleeve and said outer sleeve resiliently urging the latter into said limiting position, said outer sleeve having a plurality of circumferentially spaced lugs extending longitudinally from the inner end thereof and beyond the inner portion of said inner sleeve when said outer sleeve is disposed in said limiting position, said first member outer portion including longitudinally inwardly facing surfaces between said slots for engaging the oppositely facing extremities of said lugs, the extremities of said lugs being longitudinally and rotationally positioned with respect to said helical grooves to engage said first member outer portion surfaces in response to a movement of said teeth within said helical grooves into a first position and to remain in engagement with said first member third portion surfaces in response to a subsequent movement of said teeth within said helical grooves from said first position to a second position whereby during the latter movement a relative longitudinal movement between said outer sleeve and said second member in a direction against the action of said spring means will take place, said lugs being of a size and positioned to engage within said first member outer portion slots in response to a subsequent movement of said teeth within said helical grooves beyond said second position by a rapid longitudinal movement of said outer sleeve under the action of said spring means, annular sealing means in said second member opening for engaging the cylindrical surface of said first member inner portion to thereby provide a fluid-tight communication between the passages of said members during the relative movement of said members together when said members have reached a predetermined relative position and for maintaining such fluid-tight communication when said members are together beyond said predetermined position, a valve seat in said first member passage adjacent the inner end thereof facing in a direction away from such inner end, valve means disposed in said first member passage and spring urged into a closed position in engagement with said valve seat, and means carried by said second member for moving said valve means into an open position during the movement of said teeth within said helical grooves when said teeth have reached a position within said grooves intermediate said first and second positions and beyond said predetermined position and for maintaining this valve means in an open position when said teeth are within said grooves beyond said intermediate position, the engagement of said teeth within said grooves and the engagement of said lugs with said first member outer portion surfaces being so related to the force of said spring means as to prevent the self maintenance of said teeth within said grooves in a position between said intermediate position and said second position.

References Cited in the file of this patent

UNITED STATES PATENTS

| 221,153 | Chapin | Nov. 4, 1879 |
|---|---|---|
| 1,002,774 | Stouffer | Sept. 5, 1911 |
| 1,541,139 | Hayden | June 9, 1925 |
| 1,580,694 | Smith | Apr. 13, 1926 |
| 1,673,338 | Mitchel | June 12, 1928 |
| 1,761,352 | Logan | June 3, 1930 |
| 1,857,420 | Wolford | May 10, 1932 |
| 2,648,553 | Ulrich | Aug. 11, 1953 |
| 2,665,928 | Omon et al. | Jan. 12, 1954 |
| 2,804,319 | Weber | Aug. 27, 1957 |

FOREIGN PATENTS

| 887,025 | France | July 26, 1943 |